//

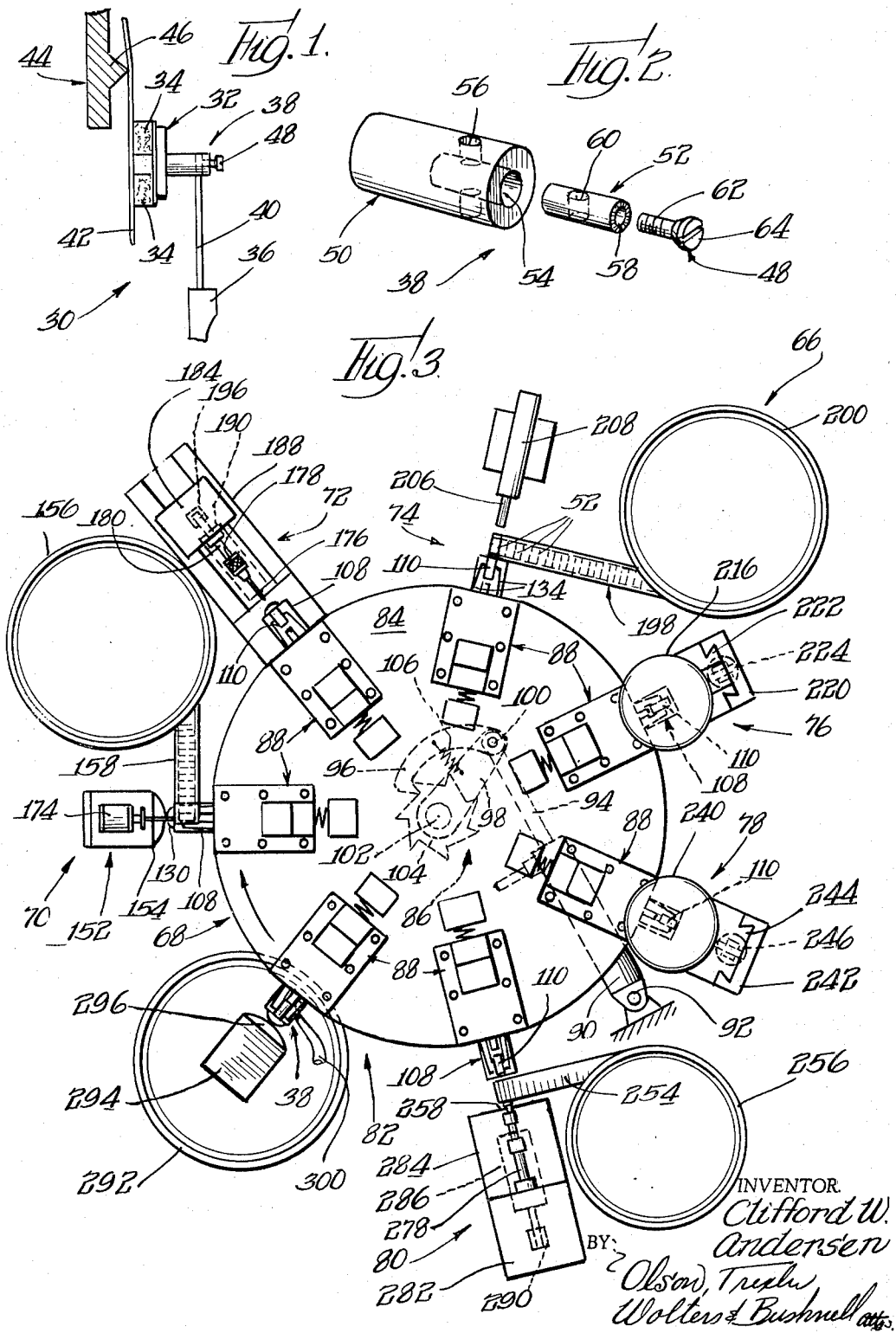
March 22, 1966 — C. W. ANDERSEN — 3,241,231
MACHINE FOR ASSEMBLING PIANO ACTION DAMPER BLOCKS
Filed July 25, 1963 — 5 Sheets-Sheet 1
INVENTOR.
Clifford W. Andersen
BY Olson, Trexler, Wolters & Bushnell

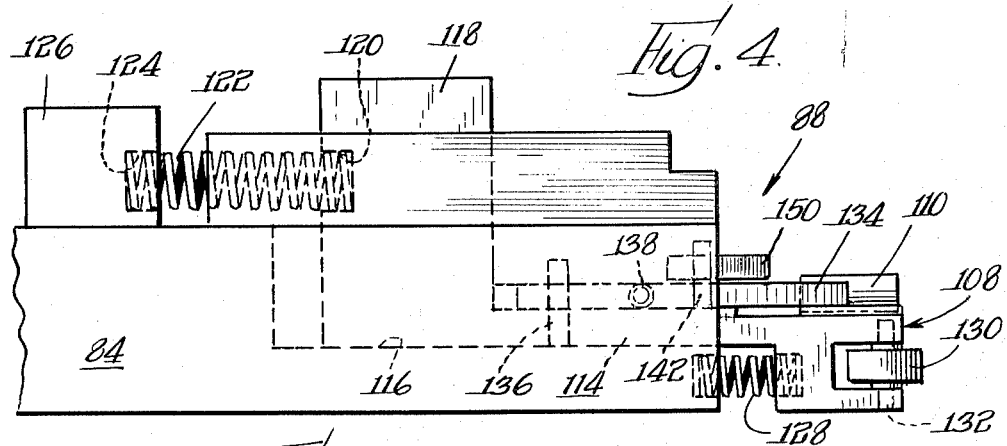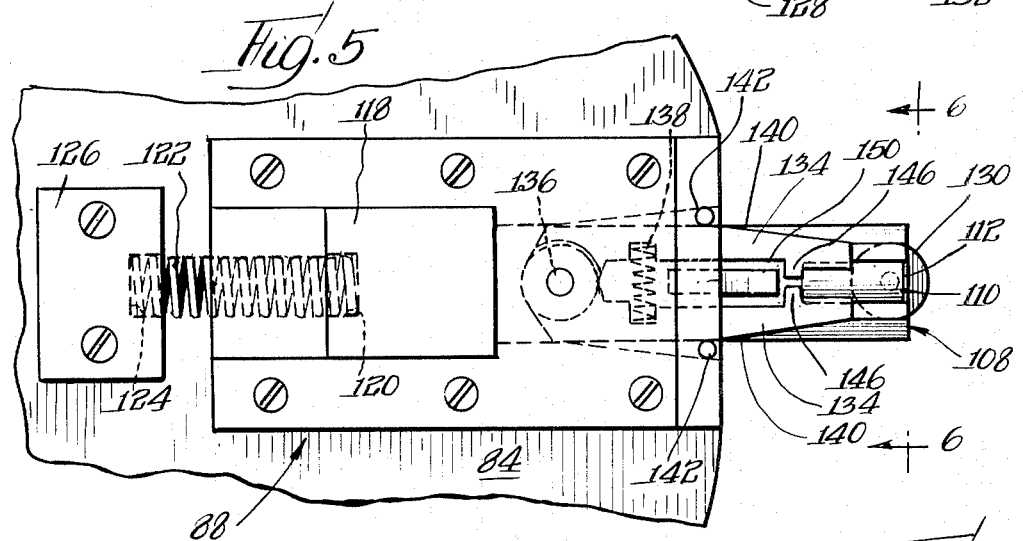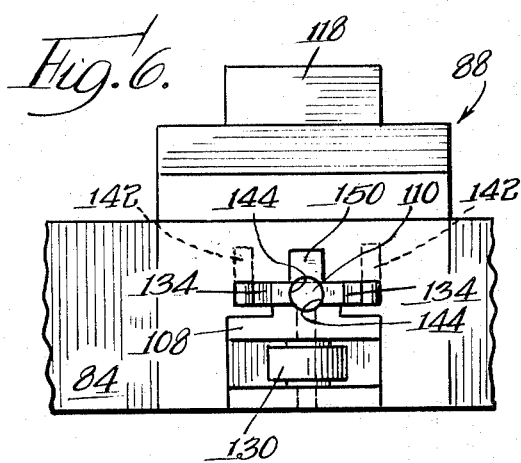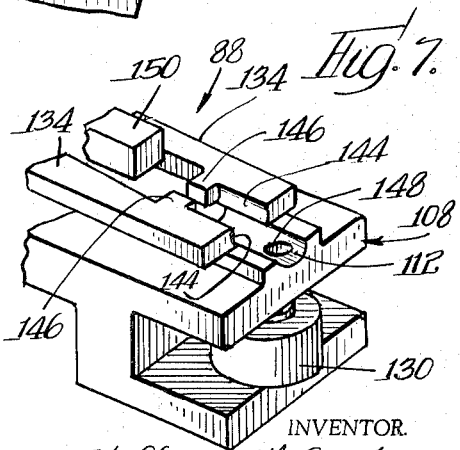

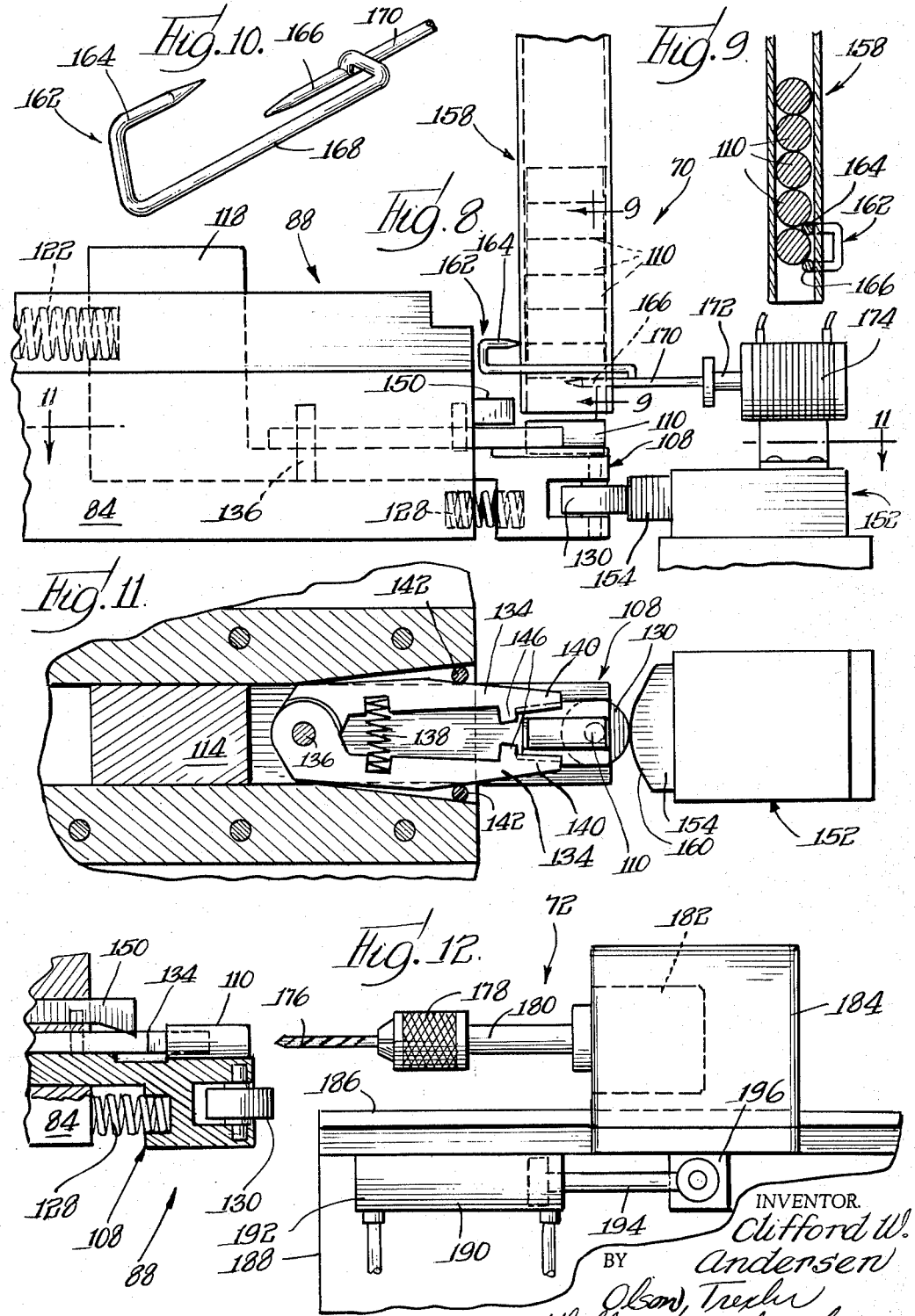

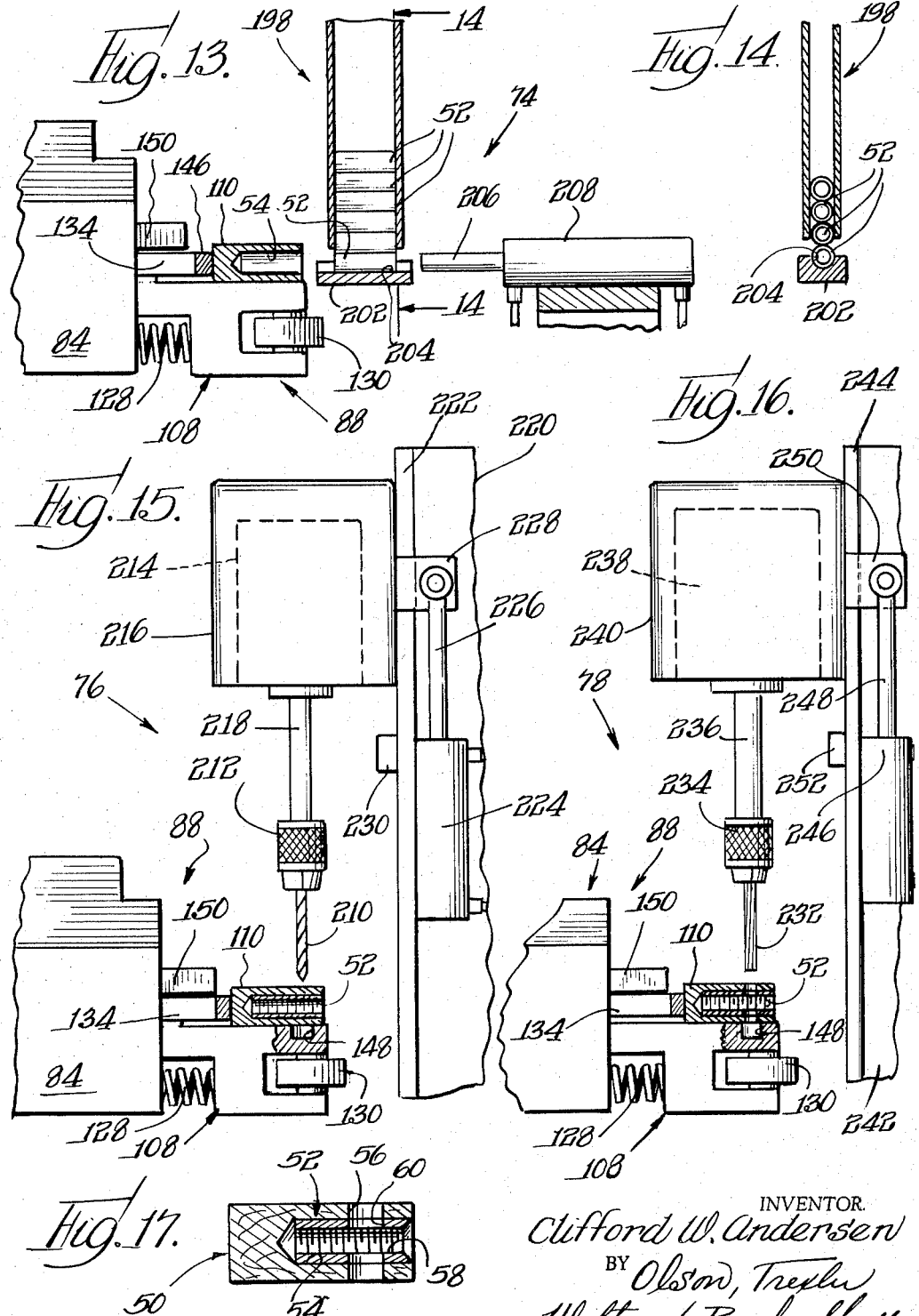

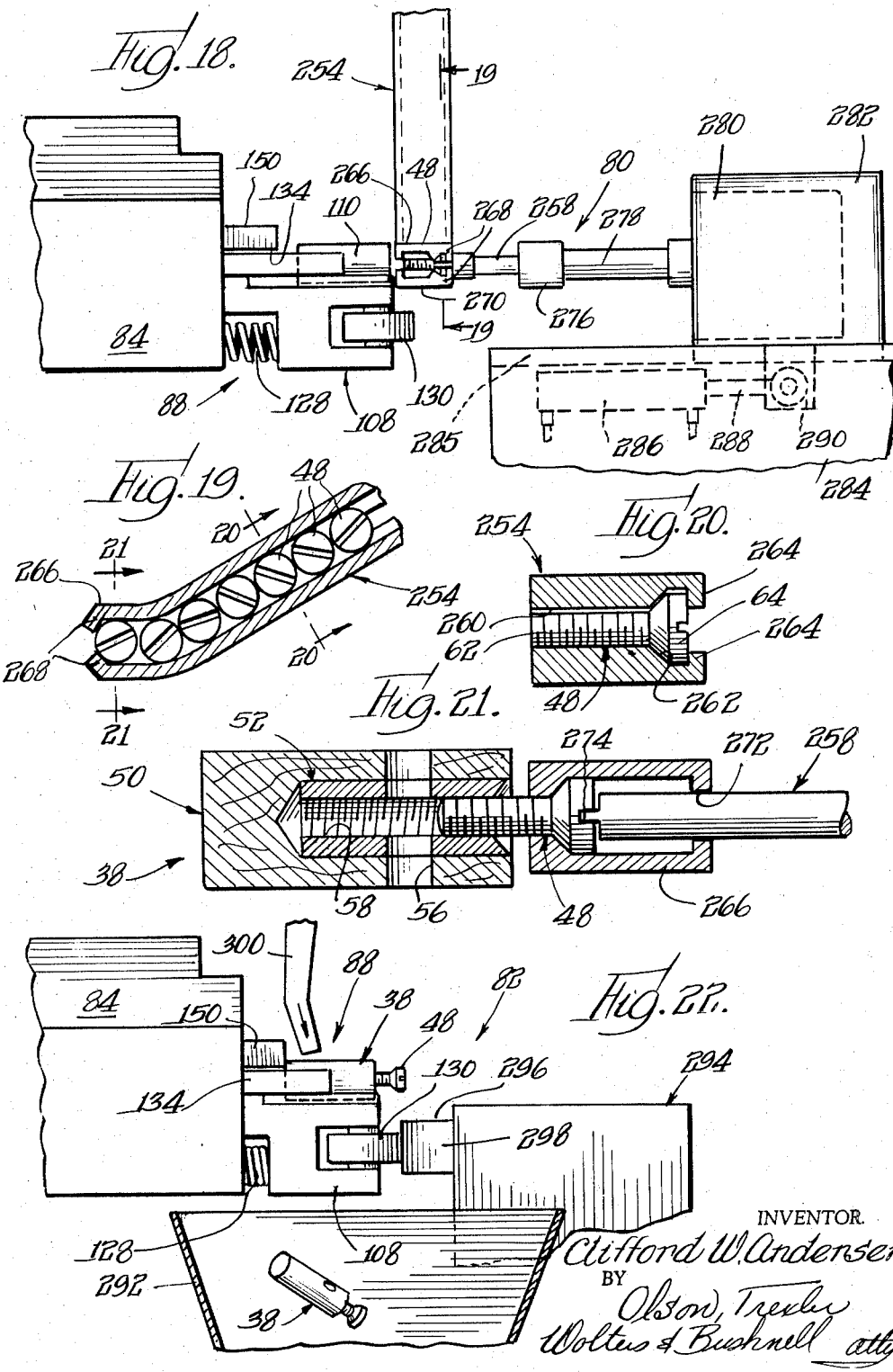

United States Patent Office 3,241,231
Patented Mar. 22, 1966

3,241,231
MACHINE FOR ASSEMBLING PIANO ACTION
DAMPER BLOCKS
Clifford W. Andersen, De Kalb, Ill., assignor to The
Wurlitzer Company, Chicago, Ill., a corporation of
Ohio
Filed July 25, 1963, Ser. No. 297,626
15 Claims. (Cl. 29—563)

This invention relates generally to the manufacture of pianos and analogous musical instruments, and it relates more particularly to apparatus for making damper block assemblies.

Individual felt dampers are customarily used in selectively muting the strings of a piano, and each of these dampers is mounted in the corresponding action mechanism by means of a damper lever, a damper lever wire and a damper block assembly. The damper block assembly is made up of three components, a wooden damper block body having axial and diametrical bores, a drilled and tapped metal bushing which is fixed in the axial bore of the block body and which has a smooth-walled transverse bore aligned with the diametrical bore of the block body to receive the damper lever wire, and a set screw threaded into the bushing to secure the block body to the damper lever wire. The metal bushing is needed because the wooden body alone is too weak for the purpose whereas an all-metal unit is too expensive and too weighty.

In the past, damper block assemblies have been produced in a sequence of separate operations on a number of different machines. This procedure has necessitated repeated handling of the parts as their manufacture progressed; and because of the diminutive size of a damper block assembly, the frequent handling of the parts has proceeded with difficulty and has proved to be an obstacle to the achievement of rapid production.

Therefore, an important object of the present invention is to provide a single machine for completely fabricating a damper block assembly from its component elements.

A more general object of the invention is to provide new and improved apparatus for assembling piano action damper blocks.

Another object of the invention is to provide a damper block assembling machine that is arranged to minimize handling of the parts.

Still another object of the invention is to provide a damper block assembling machine that is arranged to preserve a selected orientation of a damper block body during its manufacture into a completed damper block assembly.

And still another object of the invention is to provide apparatus that is arranged to advance a damper block body through a sequence of work positions for producing from it a completed damper block assembly.

A further object of the invention is to provide a damper block assembling machine that is arranged to insure alignment of the respective crossbores in the wooden damper block body and the cooperating metal bushing.

A yet further object of the invention is to provide a damper block assembling machine that is characterized by rapid and economical operation.

These and other objects and features of the invention will become more apparent from a consideration of the following disclosure.

Apparatus in accord with the invention includes a work transfer unit that is arranged to receive and advance incrementally a damper block body preform through a sequence of work positions. In addition, means are provided for feeding body preforms to the work transfer unit at one of the work positions, and a bushing assembly unit is located at a subsequent work position for seating a tubular metal bushing in the axial bore of the body preform. A drill unit is disposed at a yet subsequent work position and is mounted for vertical movement toward and away from the work transfer unit to be operative for forming a diametric bore simultaneously in the body preform and in the metal bushing. The apparatus of the invention also includes means for separating the completed damper block assemblies from the work transfer unit.

The invention, both to its structure and mode of operation, will be better understood by reference to the following disclosure and drawings forming a part thereof, wherein:

FIG. 1 is a fragmentary, side-elevational view of a portion of a piano action mechanism, showing in particular the damper block assembly which is used in mounting a resilient damper head to a damper lever;

FIG. 2 is an enlarged, exploded perspective view of the damper block assembly of FIG. 1;

FIG. 3 is a top plan view of apparatus constructed in compliance with the principles of the present invention to be used in making damper block assemblies of the type shown in FIG. 2;

FIG. 4 is a side-elevational view illustrating the processing table of the work transfer unit incorporated in the apparatus of FIG. 3, showing one of the parts-receiving holders that are mounted adjacent the periphery of the processing table;

FIG. 5 is a top plan view of the arrangement of FIG. 4;

FIG. 6 is an end elevational view taken substantially along the line 6—6 of FIG. 5;

FIG. 7 is an enlarged perspective view of the parts-receiving holder of FIGS. 4–6, showing the convergible jaws which are included in the holder for laterally releasably gripping a damper block body preform;

FIG. 8 is a side elevational view of the first work position in the apparatus of FIG. 3 at which damper block body preforms are delivered to and received by the holders of the work transfer unit;

FIG. 9 is an enlarged view taken substantially along the line 9—9 of FIG. 8;

FIG. 10 is an enlarged perspective view of the parts delivery fork that is used in passing damper block body preforms one at a time to the work transfer unit at the work position illustrated in FIGS. 8 and 9;

FIG. 11 is a plan view taken substantially along the line 11—11 of FIG. 8;

FIG. 12 is a side elevational view of the second work position in the apparatus of FIG. 3 where the damper block body preforms are bored axially to receive the tubular metal bushing;

FIG. 13 is a side elevational view of the third work position where the bushings are seated in the previously formed bore;

FIG. 14 is a view taken substantially along the line 14—14 of FIG. 13;

FIG. 15 is a side elevational view of the fourth work position at which the assembled damper block body preform and tubular bushing are simultaneously fashioned with a crossbore;

FIG. 16 is a side elevational view of the fifth work position at which the previously formed crossbore is reamed to remove burrs;

FIG. 17 is an enlarged, central cross-sectional view of the damper block assembly after axial boring, crossboring and reaming;

FIG. 18 is a side elevational view of the sixth work position at which a set screw is turned into the threaded axial bore of the assembled body preform and bushing;

FIG. 19 is an enlarged elevational view taken substantially along the line 19—19 of FIG. 18;

FIG. 20 is an enlarged sectional view taken substantially along the line 20—20 of FIG. 19;

FIG. 21 is an enlarged sectional view taken substantially along the line 21—21 of FIG. 19 and showing the action of the driver in turning the set screw into the bushing; and FIG. 22 is a side-elevational view of the last work position at which the completed damper block assemblies are removed from the work transfer unit.

Referring now in detail to the drawings, specifically to FIG. 1, a piano action mechanism indicated generally by the numeral 30 is shown to include a damper head 32 which includes vertically spaced felt blocks 34. The damper head 32 is mounted to a damper lever 36 by means of a cylindrical damper block assembly 38 and a damper wire or rod 40 whereby the felt blocks 34 may be swung into selective, damping engagement with a piano string 42. In accordance with conventional practice, the piano string 42 is mounted to a piano frame 44, and the damper head 32 is positioned to engage the piano string 42 beneath an upper bridge 46 of the frame 44. The damper head 32 is advantageously attached to the damper block assembly 38 by adhesive or other suitable means, and the damper block assembly 38 is provided with intersecting bores for receiving respectively the damper rod 40 and a set screw 48.

Considering FIG. 2, the damper block assembly 38, in addition to the set screw 48, includes a cylindrical wooden block body 50 and a tubular metal bushing 52. The damper block body 50 is fashioned from a solid cylindrical parts element or preform; and in the finished damper block assembly, the block body 50 incorporates both an axial bore 54 that penetrates deeply into the body and a crossbore 56 which intersects the axial bore 54. The bushing 52 is adapted to be seated in the axial bore 54 and is ordinarily formed preliminarily with an axial, drilled and tapped bore 58. The tubular metal bushing 52 is also provided with a smooth-walled crossbore 60 that is adapted to be aligned with the crossbore 56 so that the damper block assembly 38 may receive and pass the damper lever wire 40. The set screw 48 includes a shank 62 which is fashioned with a cooperating thread whereby to permit the set screw to be turned into the tapped axial bore of the bushing 52. The set screw 48 also includes a diametrically slotted head 64.

Apparatus which is constructed in compliance with the invention for manufacturing the damper block assembly 38 is indicated generally by the numeral 66 in FIG. 3. The apparatus 66 includes a work transfer unit 68 for receiving and advancing a damper block body preform through a sequence of seven spaced work positions; and appropriate work devices are located at each of these seven spaced positions. In manufacturing sequence, these work devices include a preform feeding unit 70, a horizontal boring unit 72, a bushing assembly unit 74, a vertical boring unit 76, a deburring unit 78, a set screw assembly unit 80 and a discharge unit 82. In the apparatus 66, the several work positions are arranged in circular sequence although they may be also arranged in a straight line sequence. However, a circular sequence of work positions has proved to be somewhat more efficient of factory floor space.

The work transfer unit 70 specifically includes a rotatable processing table 84, an indexing drive 86 for stepping the table 84 in angularly incremental manner and a number of parts-receiving holders 88 which are mounted on the table 84 adjacent the periphery thereof. The holders 88 are spaced apart by a distance corresponding to the spacing of the several work positions, and the drive 86 is arranged to step the table 84 in angular increments corresponding to this spacing. Thus, incremental rotation of the table 84 steps the parts receiving holders 88 from one work position to the next in a continuous sequence. Continuing with reference to FIG. 3, the indexing drive 86 is shown to include a fluid-actuated jack 90 which is swingable about a fixed pivot 92. The jack 90 includes a horizontally extensible and retractable piston rod 94, and both a pawl 96 and a link 98 are pivotally mounted to the free end of piston rod 94 by means of a pin 100. A vertical shaft 102 is secured coaxially to the table 84, and a ratchet wheel 104 is rigidly and coaxially secured to the shaft 102 for engagement with the pawl 96. The link 98 is rotatably mounted on the shaft 102 whereas a tension spring 106 is connected between the link 98 and the pawl 96 to bias the pawl into engagement with the ratchet wheel 104. It will be recognized that retractable motion of the piston rod 94 causes the pawl 96 to rotate the ratchet wheel 104 and thereby index the table 84 through a selected arc of movement. Correspondingly, extensible movement of the piston rod 94 results in the pawl 96 riding radially yieldably over a tooth on the ratchet wheel 104 and into position for subsequent rotation of the ratchet wheel and the processing table.

Turning to a consideration of FIGS. 4–7 and giving attention first to FIGS. 4 and 5, a parts-receiving holder 88 comprises a carrier member 108 that is arranged for supportingly contacting the underside of a damper block body preform 110. Specifically, the carrier member 108 is fashioned with a longitudinally extending semicylindrical groove 112, best seen in FIG. 7, groove 112 being sized to receive the cylindrical preform 110 in a fitting relationship. Furthermore, the carrier member 108 includes a tongue portion 114 that is radially slidably received in a recess 116 formed in the processing table 84. A post 118 is mounted on the tongue portion 114, and post 118 is fashioned with a shallow, horizontal bore 120 which serves to locate one end of a compression spring 122. The other end of compression spring 122 is located in a shallow, horizontal bore 124 that is formed in a stop block 126. The stop block 126 is rigidly mounted on the processing table 84, and the spring 122 cooperates with a smaller compression spring 128 in biasing the carrier member 108 radially outwardly of the processing table, compression spring 128 being located in shallow horizontal bores formed respectively in the outer edge of the processing table and in the confronting face of the carrier member. For purposes which will become more apparent hereinafter, the carrier member 108 is intended to be engaged aggressively and forced thereby radially inwardly of the processing table 84. As will also become more apparent hereinafter, the carrier member 108 is intended to be rotated into aggressive engagement with a stationary abutment member by the incremental rotation of the processing table. In order to facilitate the making and breaking of this aggressive engagement, a roller 130 is journaled on a shaft 132 to extend its marginal edge beyond the front edge of the carrier member.

Because the various work elements are disposed radially outwardly and generally vertically above both the processing table 84 and the parts-receiving holders 88, the holders 88 are particularly arranged to clear the areas upwardly and outwardly of the groove 112 and thereby upwardly and outwardly of the supported location of the body preform 110. It is also important that the body preform 110 be both supported against forces tending to move it radially inwardly of the processing table 84 and held in a selected position of orientation about its own axis during the manufacturing operations, especially between the vertical boring unit 76 and the deburring unit 78. Therefore, and in order to provide laterally releasable gripping of a body preform 110, the holder 88 is constructed to include convergible jaw elements 134 which are situated operatively overlying the carrier member 108. The jaw elements 134 are pivotally mounted on the tongue portion 114 of carrier member 108 by means of a common pivot pin 136; and a compression spring 138, best seen in FIG. 5, acts to bias the jaw elements 134 normally apart. The outer edge of each of the jaw elements 134 defines a cam surface 140, and cooperating cam posts 142 depend from the roof of the recess 116. The cam posts 142 engage the cam surfaces 140 to cause converging of the jaw elements 134 upon radially outward movement of the jaw elements relative to the processing table 84 and to direct diverging of the jaw elements upon movement of the carrier member radially inwardly of the processing table.

As is particularly well shown in FIGS. 6 and 7, the jaw elements 134 have confronting edge surfaces 144 that are concavely fashioned to conform to the contour of the body preform 110. Moreover, the jaw elements 134 have a vertical dimension or thickness which is less than the diameter of the body preform in order to expose a substantial portion of the body preform, in order to avoid interfering with the manufacturing operations which are to be performed thereon, and in order to facilitate stripping of the finished damper block assemblies from the carrier member. In addition, the jaw elements 134 are provided with confronting stops or abutments 146 that are arranged to both contact the inner end of the body preform and oppose forces tending to move the preform radially inwardly of the processing table. Furthermore, a vertical clearance hole 148 is fashioned in the floor of the groove 112, as is shown in FIG. 7, in order to allow free passage to the drill of the vertical boring unit 76, it having proved advantageous to arrange the clearance hole 148 to take a substantially greater diameter than the drill. A horizontally aligned stripper post 150 is fixed in the outer edge of the processing table 84 to extend radially outwardly thereof in parallel alignment with the axis of the groove 112 and spaced above the jaw elements 134, stripper post 150 serving to separate the body preform 110 from the carrier member 108 upon extreme inward movement of the carrier member relative to the processing table.

The jaw elements 134 are advantageously spread apart slightly to receive a damper block body preform 110 at the feeding unit 70. Therefore and returning to FIG. 3, the unit 70 is seen to include an abutment device 152 that includes a stationary work element 154, work element 154 being situated in obstructing relationship relative to the arcuate path of movement of the rollers 130. The preform feeding unit 70 also includes a conventional vibrating hopper 156 which provides a reservoir for a quantity of the damper block body preforms 110 and which supplies these body preforms in parallel orientation to a chute 158.

Turning to a consideration of FIGS. 8–11 for a more detailed description of the preform feeding unit 70, the abutment device 152 is seen to be disposed in alignment with the carrier member 108 radially outwardly of the processing table 84. Moreover, the work element 154 is seen to be fashioned with a cylindrical cam surface 160, best seen in FIG. 11, cam surface 160 being gradually engaged by the roller 130 as the processing table 84 rotates the parts-receiving holder 88 into the work position associated with the preform feeding unit 70. Because the work element 154 is situated in obstructing relationship relative to the path of roller 130, aggressive interengagement between these parts causes the carrier member 108 to be urged radially inwardly of the processing table against the force of springs 122 and 128. Correspondingly, the cooperation between the cam surfaces 136 and the cam posts 142 allows the compression spring 138 to spread the jaw elements 134 for accepting a body preform 110 generally therebetween and in the groove 112 which has been fashioned in the carrier member for fittedly receiving the same.

As is well shown in FIG. 8, the chute 158 is arranged with its discharge end overlying the location of the carrier member 108 at the first work position. Thus, body preforms 110 may be extracted one at a time from the chute 158 to be deposited on the carrier member 108 between the spread jaw elements 134. In order to pass individual body preforms from the chute 158 in a selective manner, a parts delivery fork 162 is arranged in cooperative relationship with the discharge end of the chute as is shown in FIG. 8. With reference for the moment to FIG. 10, the delivery fork 162 includes axially opposed tines 164 and 166 which are spaced both vertically and horizontally apart. A deflected arm 168 interconnects the tines 164 and 166, and a shank 170 merges into the arm 168 adjacent the tine 166 for use in mounting the parts delivery fork to a reciprocable piston rod 172, as is shown in FIG. 8. The piston rod 172 is operated by means of a fluid-actuated jack 174 that is conveniently mounted on the abutment device 152 whereby to extend the parts delivery fork 162 into operative relationship with the chute 158 at a position generally overlying the location of the carrier member 108.

With particular reference to both FIGS. 8 and 9, the tine 164 is seen to take a vertically higher position than the tine 166. Thus, the tine 164 may serve to restrain the aligned body preforms within the chute 158 while the tine 166 is releasing the lowermost preform. The released preform drops into the carrier member 108 between the spaced jaw elements 134. The confronting tips of the tines 164 and 166 are also appropriately spaced so that the lower tine 166 may catch the next lowermost of the body preforms when the upper tine 164 is moved out of the path of the aligned body preforms. Hence, reciprocation of the parts delivery fork 162 under the direction of jack 174 causes the aligned body preforms 110 to be dropped individually and in properly timed relationship to the underlying holders 88.

It is to be recognized that, upon subsequent rotation of the processing table 84, the jaw elements 134 are converged by the interaction of cam surfaces 136 and cam posts 142 whereby to grip the received body preform as the roller 130 is moved out of engagement with the work element 154 and as the springs 122 and 128 urge the carrier member 108 radially outwardly of the processing table. Thus, the jaw elements 134 firmly grip the body preform 110 for subsequent manufacturing operations.

With reference to FIGS. 3 and 12, the horizontal boring unit 72 which is situated at the second of the seven work positions includes a drill bit 176 that is gripped by a chuck 178 for horizontal movement toward and away from the processing table 84. The chuck 178 is affixed to a shaft 180 that comprises the output shaft of a suitably energized motor 182 which is mounted in a horizontally reciprocable carriage 184, motor 182 rotating shaft 180 and chuck 178 in order to rotate the drill bit 176. In order that the rotating drill bit 176 may be operated to form an axial bore in the body preform 110, the carriage 184 is slidably mounted on tracks 186 which are supported by a pedestal 188. A fluid actuated jack 190 includes a cylinder 192 which is securely attached to the pedestal 188, jack 190 additionally including an extensible and retractable piston rod 194 that is connected to the carriage 184 by means of a bracket 196 whereby reciprocation of the piston rod 194 is capable of oscillating the carriage 184 and therefore the drill bit 176 toward and away from the parts-receiving holder 88. The oscillatable and rotatable drill bit 176, being aligned coaxially with the stopped location of the body preform 110 at the second work position, acts to form the axial bore indicated in FIG. 2 by the reference numeral 54. The confronting stops 146, which have been described hereinbefore as being incorporated in the jaw elements 134, act to oppose the force imposed on the body preform 110 by the aggressively advancing drill bit 176.

Considering FIGS. 13 and 14 in conjunction with FIG. 3, the bushing assembly unit 74 comprises a chute 198 that is adapted to feed the tubular metal bushings 52 into axial alignment with the rest location of the previously bored body preform 110 at the third work position. A conventional vibrating hopper 200 provides a reservoir for a quantity of the bushings 52 and delivers bushings in parallel orientation to the chute 198 which is connected to it. In addition, a platen 202 is aligned beneath the discharge end of the chute 198, and the platen 202 is fashioned with an upwardly opening, semi-cylindrical channel 204 for receiving a bushing 52 from the chute 198 and for aligning the receiving bushing with the axial bore 54 in the damper block body preform 110, as is shown in FIG. 13. The bushing assembly unit 74 also includes driver means for seating a bushing 52 in the axial bore 54 of the body preform; and in the illustrated embodiment, this driver means comprises a solid cylindrical rod 206 that is reciprocated toward and away from the location of the body preform at the third work position by means of a fluid actuated jack 208, rod 206 being connected to the piston of the jack 208. Advantageously, the bushing 52 and the bore 54 in the body preform are sized to provide an interference fit therebetween in order that the body preform may receive and hold the bushing in substantially non-rotatable fashion. Therefore, the jack 208 is provided with sufficient power to drive the bushing into the axially bored preform. The confronting abutments 146 of jaw elements 134 serve to support the body preform against the axial forces imposed by the forcibly entering bushing 52.

After the tubular bushing 52 has been seated in the damper block body preform 110, the work transfer unit 68 is indexed to deliver the assembled preform and bushing to the vertical boring unit 76 which is shown in FIGS. 3 and 15. The vertical boring unit 76 includes a drill bit 210 that is mounted in a chuck 212 for vertical movement transverse the location of the body preform 110 toward and away from the work transfer unit for simultaneously forming a diametric bore in the body preform and in the assembled bushing. In order to provide rotative energy to the drill bit 210, the vertical boring unit 76 includes a suitably energized motor 214 that is mounted on a carriage 216, motor 214 including an output shaft 218 to which the chuck 212 is secured. For purpose of vertically oscillating the drill bit 210 into and out of boring engagement with the assembled body preform and bushing, the carriage 216 is vertically slidably coupled to a post 220 by means of a dovetail slide arrangement 222; and a hydraulic jack 224 is also fastened to the post 220, the fluid actuated jack 224 having a vertically extensible and retractable piston rod 226 that is connected to the carriage 216 by means of a bracket 228. Thus, operation of the jack 224 directs the rotating drill bit 210 into and out of boring engagement with the assembled body preform and bushing. Advantageously, a downstop 230 is affixed to the post 220 to extend outwardly therefrom and into obstructing relationship with the path of movement of carriage 216 to limit the downward movement thereof. As is particularly well shown in FIG. 15, the clearance hole 148 takes a diameter which is considerably greater than the diameter of drill bit 210 whereby to permit the drill bit to pass completely through the assembled body preform and tubular bushing for completely forming the crossbores therein. Moreover, the location of stop 230 is arranged to cooperate with the location of the floor of the clearance hole 148 so that the drill bit 210 does not engage the floor of the hole and perform unnecessary work tending to dull the drill bit and slow production.

Since the drill bit 210 boringly engages the metal bushing 52, it has proved advantageous to incorporate a deburring unit 78 at the fifth work position, i.e. at the work position subsequent to the vertical boring unit 76. With reference to FIGS. 3 and 16, the deburring unit 78 includes a reaming tool 232 that is gripped by a chuck 234, the chuck 234 being mounted on a shaft 236. Shaft 236 comprises the output shaft of a suitably energized motor 238 whereby to provide rotative force to the reaming tool 232; and for purposes of vertically oscillating the reaming tool into and out of operative engagement with the assembled body preform and bushing, the motor 238 is mounted in a carriage 240 that is vertically, slidably coupled to a post 242 by means of a dovetail slide arrangement 244. A fluid actuated jack 246 is securely fastened to the post 242 and includes a vertically extensible and retractable piston rod 248 which is connected to the carriage 240 by a bracket 250. Thus, actuation of the jack 246 is capable of vertically reciprocating the rotatable reaming tool 232 for deburring the previously formed crossbore in bushing 52. The clearance hole 148 in carrier member 108 also takes a diameter which is larger than the reaming tool 232, and a downstop 252 is mounted on the side of post 242 to limit the downward movement of carriage 240 whereby to prevent the tip of reaming tool 232 from engaging the floor of the hole 148.

After the deburring unit 78 has finished its work on the damper block body preform and assembled bushing, the part is complete except for the addition of a set screw 48, the part at this stage of manufacture being illustrated in detail in FIG. 17. Considering FIG. 3 in conjunction with FIGS. 18–21, the set screw assembly unit 80 includes a chute 254 for feeding parallel oriented set screws 48 from a conventional vibrating hopper 256 and into axial alignment with the location of body preform 110 at the sixth work position. The set screw assembly unit 80 also comprises a rotatable and horizontally reciprocable driver tool 258; and the chute 254 is particularly arranged to deliver set screws 48 individually into alignment between the driver tool 258 and the location of the body preform 110 with the head of the set screw facing the driver tool. In order to deliver the set screws 48 into this position, the illustrated embodiment of chute 254 is particularly provided with a cross-section which is best shown in FIG. 20. There, the chute 254 is seen to include a channel 260 of generally rectangular section and of a shape and size appropriate for receiving and passing the shank portions of the parallel disposed set screws 48. In addition, the chute 254 is fashioned with a confluent channel 262 which takes a cross-section corresponding to the silhouette of the head 64 of a set screw 48. The channels 260 and 262 are sufficiently larger than the corresponding portions of the set screw 48 to permit both sliding and rolling passage of the set screws. Stop lips 264 are advantageously provided adjacent the outer side of channel 262 to keep the set screws 48 within the chute 254.

The chute 254 terminates at its discharge end in a pocket member 266 having flanged ends 268 or other similar structure for stopping movement of the set screws along the longitudinal axis of the chute 254. The flanged end 268 advantageously are aligned with the heads of the set screws 48; and the pocket member 266 is also fashioned with an outlet aperture 270 best seen in FIG. 18, aperture 270 being sized and shaped to pass the shank and the head of a set screw 48 after the same has been turned into a tubular bushing 52. With reference to FIG. 21, the pocket member 266 is also fashioned with an opening 272 that is aligned with the axis of the set screw 48 whereby to pass the driver tool 258 into turning engagement with the slotted head of the set screw. As is best shown in FIG. 21, the driver tool 258 is provided with a diametrically disposed, axially extending tongue 274 that meshes with the slot in the head of the set screw 48 upon proper alignment therewith. It will be recognized that the driver tool 258, upon being rotated, eventually achieves such an alignment.

Returning to FIG. 18, the driver tool 258 is seen gripped by a chuck 276 which is attached to an output shaft 278 of a suitably energized motor 280 whereby to provide rotative force to the driver tool. In order to reciprocate the driver tool toward and away from a set screw 48 that is being held in pocket member 266, the motor 280 is mounted in a carriage 282; and the carriage 282 is horizontally slidably mounted on a pedestal 284 by means of a dovetail slide arrangement 285. Reciprocating force is transmitted to the carriage 282 from a fluid actuated jack 286 which is fastened to the pedestal and which includes a horizontally extensible and retractable piston rod 288, rod 288 being coupled to the carriage 282 by means of a bracket 290.

Seating of the set screw 48 in the previously assembled body preform and tubular bushing completes the manufacture of the damper block body assembly 38; and thereafter, it is necessary to clear the parts-receiving holder 88 of the finished part in order that the work cycle may be repeated. Therefore, the discharge unit 82 is located at the seventh and last work position subsequent to the set screw assembly unit 80. The discharge unit 82 advantageously includes a collection bin 292 that is positioned beneath the edge of the processing table 84 at the last work position to receive the damper block assemblies 38 as they are released and discharged from the parts-receiving holders 88. In addition, the discharge unit 82 includes an abutment device 294 that is situated radially outwardly of the processing table 84 in alignment with the last work position of the parts-receiving holders 88. The abutment device 294 is provided with a stationary work element 296 having a semi-cylindrical surface 298 that is situated in obstructing relationship relative to the path of rollers 130 for causing movement of the corresponding carrier member 108 toward the processing table 84. Accordingly, the abutment device 294 is similar to the abutment device 152 which is incorporated in the preform feeding unit 70. However, the semi-cylindrical surface 298 is positioned in obstructing relationship relative to the roller 130 by an amount which causes such a radially inward movement of the carrier member 108 as to cause the stripper post 150 to engage the confronting end of the damper block assembly 38 after the jaw elements 134 have released their grip thereon whereby to cause at least a partial stripping action of the completed assembly from the holder 88. Advantageously, an air jet 300 is disposed overlying the position of the completed damper block assembly at the last work station to cooperate with the stripper post 150 in ejecting the finished parts from the holders 88 and into the bin 292. After the completed damper block assemblies 38 have been ejected from the holders 88 by the discharge unit 82, the holders are ready to be recycled to the preform feeding unit 70 by the indexing action of the work transfer unit 68.

The manner in which the present invention may be practiced and the purposes to which it may be put are evident from the foregoing descriptions.

The specific example herein shown and described should be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. Apparatus to be used in making damper block assemblies for pianos and analogous musical instruments, said apparatus comprising: work transfer means for receiving and advancing a damper block body preform through a sequence of work positions; means for feeding body preforms to said transfer means at one of said work positions; bushing assembly means at a second work position for seating a bushing in the axial bore of a said body preform; drill means at a third work position mounted for movement toward and away from said work transfer means and operative to form a diametric bore simultaneously in said body preform and on said bushing; and means at a fourth work position for separating completed damper block assemblies from said work transfer means.

2. Apparatus to be used in making damper block assemblies for pianos and analogous musical instruments, said apparatus comprising: work transfer means for receiving and advancing a damper block body preform through a sequence of work positions; means for feeding body preforms to said transfer means at one of said work positions; bushing assembly means at a second work position for seating a tubular bushing in the axial bore of a said body preform; drill means at a third work position mounted for movement toward and away from said work transfer means and operative to form a diametric bore simultaneously in said body preform and said bushing; set screw assembly means at a fourth work position for turning a set screw into the tubular bushing that has been seated in said body preform; and means at a fifth work position for separating completed damper block assemblies from said work transfer means.

3. Apparatus to be used in making damper block assemblies for pianos and analogous musical instruments, said apparatus comprising: work transfer means for receiving and advancing a damper block body preform through a sequence of work positions; means for feeding body preforms to said transfer means at one of said work positions; drill means at a second work position mounted for horizontal movement toward and away from said work transfer means and operative to form an axial bore in a said body preform; bushing assembly means at a third work position for seating a tubular bushing in the axial bore of the body preform; second drill means at a fourth work position, mounted for movement toward and away from said work transfer means and operative to form a diametric bore simultaneously in said body preform and said bushing; set screw assembly means at a fifth work position for turning a set screw into a tubular bushing that has been seated in said body preform; and means at a sixth work position for separating completed damper block assemblies from said work transfer means.

4. Apparatus to be used in making damper block assemblies for pianos and analogous musical instruments, said apparatus comprising: work transfer means for receiving and advancing a damper block body preform through a sequence of work positions; means for feeding body preforms to said transfer means at one of said work positions; bushing assembly means at a second work position, including means feeding tubular bushings into axial alignment with the location of said body preform at said second work position and a reciprocable driver for seating a said bushing in the axial bore of the body preform; drill means at a third work position, mounted for movement toward and away from said work transfer means and operative to form a diametric bore simultaneously in said body preform and said bushing; set screw assembly means at a fourth work position, including means feeding set screws into axial alignment with the location of said body preform at said fourth work position and a rotatable and reciprocable driver for turning a set screw into the tubular bushing that has been seated in said body preform; and means at a fifth work position for separating completed damper block assemblies from said work transfer means.

5. Apparatus to be used in making damper block assemblies for pianos and analogous musical instruments, said apparatus comprising: work transfer means for receiving and advancing a damper block body preform through a sequence of work positions, including a plurality of parts-receiving holders each of which has carrier means for supportingly contacting the underside of a said body preform and means for laterally releasably gripping a said body preform operatively overlying said carrier means, said holder being arranged to clear the areas upwardly and outwardly of the supported location of said body preform whereby to facilitate axial and radial access to said body preform; means for feeding body preforms to said transfer means at one of said work positions; bushing assembly means at a second work position for seating a tubular bushing in the axial bore of the body preform; drill means at a third work position, mounted for movement transverse the location of said body preform toward and away from said work transfer means and operative to form a diametric bore simultaneously in said body preform and said bushing; and means at a fourth work position for separating completed damper block assemblies from said work transfer means.

6. Apparatus to be used in making damper block assemblies for pianos and analogous musical instruments, said apparatus comprising: work transfer means for receiving and incrementally advancing a damper block body preform through a sequence of work positions, including a rotatable processing table, operatively connected to said table for an indexing drive for stepping said table in angularly incremental manner, and a plurality of parts-receiving holders mounted on said table adjacent the periphery thereof, each of said holders having carrier means for supportingly contacting the underside of a said body preform, means for laterally releasably gripping a said body preform operatively overlying said carrier means, and means for axially abutting a supported and releasably gripped body preform to oppose longitudinal movement thereof, said holder being arranged to clear the areas upwardly and outwardly of the supported location of said body preform whereby to facilitate axial and radial access to said body preform; means for feeding body preforms to said transfer means at one of said work positions; bushing assembly means at a second work position for seating a tubular bushing in the axial bore of the body preform; drill means at a third work position, mounted for vertical movement transverse the location of said body preform toward and away from said work transfer means and operative to form a diametric bore simultaneously in said body preform and said bushing; and means at a fourth work position for separating completed damper block assemblies from said work transfer means.

7. Apparatus to be used in making damper block assemblies for pianos and analogous musical instruments, said apparatus comprising: work transfer means for receiving and advancing a damper block body preform through a sequence of work positions, including a rotatable processing table, an indexing drive operatively connected to said table for stepping said table in angularly incremental manner, and a plurality of parts-receiving holders mounted on said table adjacent to the periphery thereof, each of said holders having carrier means for supportingly contacting the underside of a said body preform, convergible jaws for laterally releasably gripping a said body preform operatively overlying said carrier means, and means for axially abutting a supported and releasably gripped body preform to oppose movement thereof radially inwardly of said table, said holder being arranged to clear areas upwardly and outwardly of the location of said body preform whereby to facilitate axial and radial access to said body preform; means for feeding body preforms to said transfer means at one of said work positions; bushing assembly means at an arcuately subsequent work position for seating a tubular metal bushing in the axial bore of the body preform; drill means at an arcuately yet subsequent work position, mounted for vertical movement transverse the location of said body preform toward and away from said work transfer means and operative to form a diametric bore simultaneously in said body preform and said bushing; and means at an arcuately still subsequent work position for separating completed damper block assemblies from said work transfer means.

8. Apparatus to be used in making damper block assemblies for pianos and analogous musical instruments, said apparatus comprising: work transfer means for receiving and advancing a damper block body preform through a sequence of work positions, including a processing table and a plurality of parts-receiving holders mounted on said table, each of said holders having carrier means for supportingly contacting the underside of a said body preform and means for laterally releasably gripping a said body preform, said work transfer means further including means mounting said carrier means for movement relative to said table, means mounting said releasably gripping means for movement with said carrier means, abutment means on said carrier means, and cam means acting between said table and said releasably gripping means for operating said releasably gripping means upon movement of said carrier means toward said table; means for feeding body preforms to said transfer means at one of said work positions; bushing assembly means at a second work position for seating a tubular bushing in the axial bore of the body preform; drill means at a third work position mounted for movement toward and away from said work transfer means and operative to form a diametric bore simultaneously in said body preform and in said bushing; and discharge means at a fourth work position for separating completed damper block assemblies from said work transfer means, including stationary abutment means disposed in interfering relationship with the abutment means on said carrier means for causing movement of said carrier means toward said table whereby to operate said releasably gripping means into parts-releasing condition.

9. Apparatus to be used in making damper block assemblies for pianos and analogous musical instruments, said apparatus comprising: work transfer means for receiving and advancing a damper block body preform through a sequence of work positions, including a processing table and a plurality of parts-receiving holders mounted on said table, each of said holders having carrier means for supportingly contacting the underside of a said body preform and convergible jaws for laterally releasably gripping a said body preform, said work transfer means further including means mounting said carrier means for movement relative to said table, means mounting said jaws for movement with said carrier means and cam means acting between said table and said jaws for operating said jaws upon movement of said carrier means toward said table, said work transfer means also including abutment means on said carrier means exposed for use in moving said carrier means relative to said table; means for feeding body preforms to said transfer means at one of said work positions; bushing assembly means at a second work position for seating a bushing in the axial bore of the body preform; drill means at a third work position for movement toward and away from said work transfer means and operative to form a diametric bore simultaneously in said body preform and in said bushing; and discharge means at a fourth work position for separating completed damper block assemblies from said work transfer means, including stationary abutment means disposed in interfering relationship with the abutment means on said carrier means for causing movement of said carrier means toward said table whereby to operate said jaws into parts-releasing condition.

10. Apparatus to be used in making damper block assemblies for pianos and analogous musical instruments, said apparatus comprising: work transfer means for receiving and advancing a damper block body preform through a sequence of work positions, including a processing table and a plurality of parts-receiving holders mounted on said table, each of said holders having carrier means for supportingly contacting the underside of a said body preform and means for laterally releasably gripping a said body preform, said work transfer means further including means mounting said carrier means for movement relative to said table, means mounting said releasably gripping means for movement with said carrier means, abutment means on said carrier means and cam means acting between said table and said releasably gripping means for operating said releasably gripping means upon movement of said carrier means toward said table; means for feeding body preforms to said transfer means at one of said work positions, including first stationary abutment means disposed in interfering relationship with the abutment means on said carrier means for causing movement of said carrier means toward said table whereby to operate said releasably gripping means into parts-receiving condition; bushing assembly means at a second work position for seating a bushing in the axial bore of the body preform; drill means at a third work position mounted for movement toward and away from said work transfer means and operative to form a diametric bore simultaneously in said body preform and in said bushing; and a discharge means at a fourth work position for separating completed damper block assemblies from said work transfer means, including second abutment means disposed in interfering relationship with the abutment means on said carrier means for causing movement of said carrier means toward said table whereby to operate said releasably gripping means into parts-releasing condition.

11. Apparatus according to claim 10 wherein said discharge means further includes a fluid jet aligned with said second stationary abutment means for removing a completed damper block assembly from said holder.

12. Apparatus to be used in making damper block assemblies for pianos and analogous musical instruments, said apparatus comprising: work transfer means for receiving and advancing a damper block body preform through a sequence of work positions, including a processing table and a plurality of parts-receiving holders mounted on said table, each of said holders having carrier means for supportingly contacting the underside of a side body preform and means for laterally releasably gripping a said body preform, said work transfer means further including means mounting said carrier means for movement relative to said table and means mounting said releasably gripping means for movement with said carrier means, said work transfer means also including abutment means on said carrier means and cam means acting between said table and said releasably gripping means for operating said releasably gripping means upon movement of said carrier means toward said table; means for feeding body preforms to said transfer means at one of said work positions; bushing assembly means at a second work position for seating a bushing in the axial bore of the body preform; drill means at a third work position mounted for vertical movement toward and away from said work transfer means and operative to form a diametric bore simultaneously in said body preform and in said bushing; discharge means at a fourth work position for separating completed damper block assemblies from said work transfer means, including stationary abutment means disposed in interfering relationship with the abutment means on said carrier means for causing movement of said carrier means toward said table whereby to operate said releasably gripping means into parts-releasing condition; and means acting to bias said releasably gripping means normally into gripping condition whereby to preserve unchanged the position of a said body preform between said first work position and said fourth work position.

13. Apparatus to be used in making damper block assemblies for pianos and analogous musical instruments, said apparatus comprising: work transfer means for receiving and advancing a damper block body preform through a sequence of work positions, including a rotatable processing table, an indexing drive for stepping said table in angularly incremental manner, and a plurality of parts-receiving holders mounted on said table adjacent the periphery thereof, each of said holders having carrier means for supportingly contacting the underside of a said body preform, convergible jaws for laterally releasably gripping a said body preform operatively overlying said carrier means, and means for axially abutting a supported and releasably gripped body preform to oppose movement thereof radially inwardly of said table, said holder being arranged to clear the areas upwardly and outwardly of the supported location of said body preform whereby to facilitate axial and radial access to said body preform, said work transfer means further including means mounting said carrier means for movement relative to said table, means mounting said convergible jaws for movement with said carrier means, abutment means on said carrier means and cam means acting between said table and said jaws for operating said jaws upon movement of said carrier means toward said table; means for feeding body preforms to said work transfer means at one of said work positions; bushing assembly means at a second work position for seating a bushing in the axial bore of the body preform; drill means at a third work position mounted for vertical movement toward and away from said work transfer means and operative to form a diametric bore simultaneously in said body preform and in said bushing; and discharge means at a fourth work position for separating completed damper block assemblies from said work transfer means, including stationary abutment means disposed in interfering relationship with the abutment means on said carrier means for causing movement of said carrier means toward said table whereby to operate said jaws into parts-releasing condition.

14. Apparatus to be used in making damper block assemblies for pianos and analogous musical instruments, said apparatus comprising: work transfer means for receiving and advancing a damper block body preform through a sequence of work positions, including a processing table and a plurality of parts-receiving holders mounted on said table, each of said holders having carrier means for supportingly contacting the underside of a said body preform and means for laterally releasably gripping a said body preform, said work transfer means further including means mounting said carrier means for movement relative to said table, means mounting said releasably gripping means for movement with said carrier means, abutment means on said carrier means and cam means acting between said table and said releasably gripping means for operating said releasably gripping means upon movement of said carrier means toward said table; means for feeding body preforms to said transfer means at one of said work positions; drill means at a second work position mounted for horizontal movement toward and away from said work transfer means and operative to form an axial bore in a said body preform; bushing assembly means at a third work position for seating a tubular bushing in the axial bore of the body preform; second drill means at a fourth work position, mounted for movement transverse the location of said body preform toward and away from said work transfer means and operative to form a diametric bore simultaneously in said body preform and in said bushing; and discharge means at a fifth work position for separating completed damper block assemblies from said work transfer means, including stationary abutment means disposed in interfering relationship with the abutment means on said carrier means for causing movement of said carrier means toward said table whereby to operate said releasably gripping means into parts-releasing condition.

15. Apparatus to be used in making damper block assemblies for pianos and analogous musical instruments, said apparatus comprising: work transfer means for receiving and advancing a damper block body preform through a sequence of work positions, including a processing table and a plurality of parts-receiving holders mounted on said table, each of said holders having carrier means for supportingly contacting the underside of a said body preform and means for laterally releasably gripping a said body preform, said work transfer means further including means mounting said carrier means for movement relative to said table, means mounting releasably gripping means for movement with said carrier means, abutment means on said carrier means and cam means acting between said table and said releasably gripping means for operating said releasably gripping means upon movement of said carrier means toward said table; means for feeding body preforms to said work transfer means at one of said work positions, including first stationary abutment means disposed in interfering relationship with the abutment means on said carrier means for causing movement of said carrier means toward said table whereby to operate said releasably gripping means into parts-receiving condition; drill means at a second work position mounted for horizontal movement toward and away from said work transfer means and operative to form an axial bore in a said body preform; bushing assembly means at a third work position, including means feeding tubular bushings into axial alignment with the location of said body preform at said third work position and a reciprocable driver for seating a said bushing in the axial bore of the body preform; second drill means at a fourth work position mounted for vertical movement toward and away from said work transfer means and operative to form a diametric bore simultaneously in said body preform and in said bushing; set screw assembly means at a fifth work position, including means feeding set screws into axial alignment with the location of said body preform and a rotatable and reciprocable driver for turning a set screw into the tubular bushing that has been seated in said body preform; discharge means at a sixth work position for separating completed damper block assemblies from said work transfer means, including second stationary abutment means disposed in interfering relationship with the abutment means on said carrier means for causing movement of said carrier means towards said table whereby to operate said releasably gripping means into parts-releasing condition; and means acting to bias said releasably gripping means normally into gripping condition whereby to preserve unchanged the position of a body preform between said first and said sixth work positions.

No references cited.

RICHARD W. EANES, JR., *Primary Examiner.*